Patented Jan. 10, 1933

1,893,982

UNITED STATES PATENT OFFICE

THEODORE F. BRADLEY, OF WESTFIELD, NEW JERSEY, ASSIGNOR TO ELLIS-FOSTER COMPANY, OF MONTCLAIR, NEW JERSEY, A CORPORATION OF NEW JERSEY

ESTER RESIN PRODUCT AND PROCESS OF MAKING SAME

No Drawing. Application filed August 18, 1927. Serial No. 213,978.

This invention relates to an ester resin product and to the process of making same and relates particularly to a new type or modification of esterified rosin which is distinguished by its exceptionally high softening point and unique solubility, said characteristics having been found particularly valuable in the production of lacquers and light colored varnishes. In the preferred form the esterified material is of pale color and therefore is exceptionally well adapted for the purpose aforesaid.

For the production of ester resins suitable for the purposes of this invention I first chemically combine rosin with glycerol or other suitable hydroxylated body to form an ester resin of nearly neutral character. As very acid resins are detrimental to lacquers and enamels and otherwise have inferior qualities, I find it desirable to so conduct the esterification that an ester resin is obtained which has an acid number of not substantially over 20, and preferably less than 10. The process of esterifying rosin is well known in the art and any suitable process may be employed but preferably one which produces a light colored product. In order to insure the lightest colored ester resin it is advantageous to conduct the esterification under vacuum or in an inert atmosphere such as in an atmosphere of nitrogen or carbon dioxide. A light colored ester of rosin thus obtained preferably constitutes the requisite raw material for the purposes of this invention.

I have found that if such esterified rosin is finely ground or pulverized and is subjected to the action of air or oxygen at an elevated temperature over a sufficient period of time, a new type of ester is obtained differing in melting point, solubility, chemical constitution and behavior on fusion from the original ester. This may be illustrated by the following:

Example A

A light colored grade of the glyceride of rosin, commercially known as "ester gum" was used. This was found to have an acid number of 7.6 and when tested for softening point by the "ball and ring" softening point test of the American Society for Testing Materials it was found to soften at 89.5° C. The resin was fully soluble in gasoline at 70° F. but not very soluble in the mono ethyl ether of ethylene glycol at this temperature. The resin fused readily when heated and did not darken appreciably when heated to 200° C. Some of this resin was very finely powdered and spread in a layer not substantially over ¼ inch thick on a paper tray and was placed in an oven maintained at 55° C. Provision was made in the oven for adequate openings to provide ventilation. After 24 hours heating the pulverized resin had slightly caked or fused, the temperature apparently being a little too high. The resin was therefore repulverized and the oven temperature lowered to 48° C. This temperature was held for one week, then increased to 60° C. for eleven days more, making a total bake of 18 days. The resin then showed an acid number of 13.4 and a softening point of 124° C. It was very pale in color and was not very soluble in gasoline at 70° F., but was soluble in the mono ethyl ether of ethylene glycol at this temperature, the solubility in each of these solvents having been reversed by the treatment. It was further observed that when the treated material was fused alone considerable foaming occurred and fusion was accomplished with much difficulty on this account. During this fusion the resin darkened badly to yield a dark reddish-brown product. This product was more soluble in gasoline and less soluble in mono ethyl ether of ethylene glycol than the unfused resin. Owing to the noted differences in solubility and to the fact that the heat-treated resin when fused foamed badly with elimination of moisture it is believed that the rosin ester undergoes an oxidation reaction with air at the temperatures stipulated, oxy or hydroxy groups being formed which rearrange at still higher temperatures (as when the resin is fused at 130 to 200° C.) with partial decomposition and elimination of water.

Owing to the fact that the products of my invention darken severely when fused alone, I have found it desirable to either dissolve the resins in cold solvents or in solvents at such temperatures as are below the point of substantial discoloration, or to dissolve in varnish oils such as linseed or tung oils at moderate temperatures. For extra light varnishes the oils should be blown or boiled separately and the resin blended at temperatures as low as possible. It has been noted that the resins made by my process, darken very much less when heated with a varnish oil than when fused alone and then incorporated with said oil. The pale color and exceptionally high melting point of the products of this invention render them especially valuable for use in varnishes. These qualities are also of value when used in lacquers. The products of this invention are especially suited for use in nitrocellulose lacquers. While high melting point rosin esters may be made by oxidizing rosin and then esterifying, such products are of dark color and are not particularly soluble in the glycol ether solvents. This is so necessarily I find, for such esterification requires high temperatures and high temperatures darken and produce chemical changes in either oxidized rosin ester.

Mono ethyl ether of ethylene glycol and other similar solvents have proven to be particularly well suited for use in lacquers intended for interior use, being free from unpleasant or otherwise objectionable odors and free from acidity. Ordinary rosin esters and high softening point esters made by first oxidizing rosin and then esterifying same are both relatively insoluble and incompatible with mono ethyl ether of ethylene glycol. On the other hand the high softening point rosin esters made according to my invention are freely soluble in this solvent. Such difference in solubility is characteristic of the products of my invention and serves as one suitable method for identifying these products.

The light color of the products of my invention are especially characteristic of the process and this is of particularly great value in the manufacture of lacquers, both of the clear and pigmented types. While of greatest value in clear and in white or light tinted enamels, even the darker colored enamels give purer shades when employing the light colored resins.

The process may be said to comprise the subjection of a rosin ester, in pulverized form, to the action of heat and air. While the first example shows that a bake treatment of 18 days' duration was given, it is to be observed that the time required need not be as long as this. The reaction is a function of time and temperature and presumably oxygen concentration as well. The lower the temperature employed, the longer will be the time required for a given increase in melting point. Low temperatures however give the palest colored products of greatest hydroxylated content. Such a product is represented in Example A. A resin of almost as good quality and soluble in mono ethyl ether of ethylene glycol was obtained as follows:

*Example B*

Rosin glyceride (ester gum) of the same lot as treated in Example A was pulverized and placed in the oven in like manner. The original softening point was 89.5° C. The resin was maintained at 50° C. the first day, 50° C. the second day, 60° C. the third day, 70° C. the fourth day. At the end of the fourth day the softening point was 116° C. Heating was continued for the fifth day at 80° C. At the end of the fifth day the softening point was 121° C. This product was not dark in color but was somewhat darker than the material in Example A. The preferred procedure therefore is that of heating in air at 50 to 60° C., although temperatures somewhat higher are not precluded. It should be noted that the initial temperature preferably should be such that the particles of powdered resin will not amalgamate and as the resin undergoes change the temperature can be slightly elevated if desired as the change progresses.

Conditions are maintained so that a satisfactorily pale colored resin is obtained, having the desired transformation in solubility and in the case of rosin glyceride esters acquiring softening point preferably between 115° C and 130° C. The acid number should be less than 20 for best results.

This invention comprises not only the rosin glyceride resinous esters, but likewise other esters of rosin. Rosin for example may be esterified with glycols, glycol ethers, pentaerythritol, sugars, various alcohols and other organic alcoholic compounds all of which may be treated by this process in order to harden the resinous materials so obtained.

For use in lacquers the products of this invention are preferably dissolved in cold solvents or in solvents at a temperature substantially below the point at which discoloration is produced. While the high melting point esters of this invention may occasionally be used alone as coating materials, it is more often advisable on account of their relatively brittle nature to incorporate nitrocellulose or other cellulose ester as a toughening agent. Lacquers may be formulated employing any proportion of the oxy-ester resin in conjunction with nitrocellulose and with or without the addition of softening or plasticizing agents, other resins, pigments, etc. The type of surface to be coated and conditions demanded in service will determine the proportions best employed for any given use. In general it may however be stated that the high softening point oxy-ester resins of this invention may be used in larger proportions and do not become tacky at such low temperatures as ordinary ester resins.

In one case a cheap wood lacquer was prepared as follows:

| | Parts by weight |
|---|---|
| High softening point oxy-rosin ester as described in Example A | 12 |
| Low viscosity nitrocellulose | 6 |
| Dibutyl phthalate | 3 |
| Butyl acetate | 30 |
| Toluol | 30 |

A pigmented brushing lacquer comprised:

| | Parts by weight |
|---|---|
| Zinc oxide | 10 |
| Chrome yellow | 2 |
| High softening point oxy-rosin ester as described in Example B | 10 |
| Low viscosity nitrocellulose | 10 |
| Tricresyl phosphate | 6 |
| Mono ethyl ether of ethylene glycol | 30 |
| Xylol | 50 |

The nitrocellulose or other cellulose ester employed in conjunction with the oxy-ester resins of this invention may be of any viscosity characteristic, although in general I prefer to employ low viscosity cellulose esters in order to secure the greatest film thicknesses in as few applications as possible. Thus I may employ nitrocellulose of ½-second viscosity or of still lower viscosity, or may use more advantageously a low viscosity nitrocellulose of greater durability having a viscosity ranging from one to 15 seconds.

The products of this invention have a wide range of utility and may be used to advantage in practically all cases to replace the low softening rosin esters in compositions of various types. Their use is especially indicated in coating materials which must stand moderate heat without much softening and also in coatings of maximum durability to abrasive influences. Some compositions of this type contain fossil resins and the oxidized rosin esters may be used to replace the more costly fossil resins.

What I claim is:

1. As a new composition of matter rosin glyceride of light color, having a softening point as measured by the "ball and ring" method of between 100° C. and 130° C. and an acid number of less than 20.

2. The process of increasing the softening point of rosin glyceride which comprises subjecting said ester in pulverized form to the action of air at a temperature of between 50° C. and 80° C.

THEODORE F. BRADLEY.

CERTIFICATE OF CORRECTION.

Patent No. 1,893,982.  January 10, 1933.

THEODORE F. BRADLEY.

It is hereby certified that error appears in the printed specification of the above numbered patent requiring correction as follows: Page 2, line 28, after "rosin" insert the words "or rosin"; and that the said Letters Patent should be read with these corrections therein that the same may conform to the record of the case in the Patent Office.

Signed and sealed this 9th day of May, A. D. 1933.

(Seal)  Acting Commissioner of Patents.